United States Patent [19]
Dickson et al.

[11] 4,167,461
[45] Sep. 11, 1979

[54] PHOTOENHANCED REDUCTION PROCESS

[75] Inventors: C. R. Dickson, Dover; A. J. Nozik, Summit, both of N.J.

[73] Assignee: Allied Chemical Corporation, Morris Township, Morris County, N.J.

[21] Appl. No.: 922,941

[22] Filed: Jul. 10, 1978

[51] Int. Cl.$^2$ ............................................. C25B 1/00
[52] U.S. Cl. ................... 204/102; 204/59 R; 204/101; 204/128; 204/DIG. 3; 429/111
[58] Field of Search ......... 204/102, 101, 128, DIG. 3, 204/59 R; 429/111

[56] References Cited

U.S. PATENT DOCUMENTS

| | | | |
|---|---|---|---|
| 4,011,149 | 3/1977 | Nozik | 204/129 |
| 4,094,751 | 6/1978 | Nozik | 204/80 |
| 4,117,202 | 9/1978 | Beck | 429/2 |

OTHER PUBLICATIONS

Anonymous, "Prototype Solar Cell Used in Ammonia Process", C and EN, pp. 19–20, (Oct. 3, 1977).
G. N. Schrauzer et al., "Photolysis of H$_2$O and Photoreduction of N$_2$ on TiO$_2$", J. Am. Chem. Soc. vol. 99, pp. 7189–7193 (1977).
S. N. Frank et al., "Semiconductor Electrodes 12. Photoassisted Oxidations and Photoelectrosynthesis at Polycrystalline TiO$_2$ Electrodes", J. Am. Chem. Soc. vol. 99, pp. 4667–4675 (1975).
E. E. Van Tamelen et al., "The Catalytic Fixation of Molecular Nitrogen by Electrolytic and Chemical Reduction", J. Am. Chem. Soc. vol. 91, p. 5194 (1969).
E. E. Van Tamelen et al., "Electrolytic Reduction of Molecular Nitrogen", J. Am. Chem. Soc. vol. 90, pp. 4492–4493 (1968).

*Primary Examiner*—Aaron Weisstuch
*Attorney, Agent, or Firm*—Horst M. Kasper; Gerhard Fuchs

[57] ABSTRACT

A system for the photoenhanced reduction of nitrogen. A p-type semiconductor cathode with a band gap between about 0.8 and 3.0 eV is irradiated with light falling within such energy range. The cathode is in contact with an electrolyte and capable of injecting photogenerated electrons into the electrolyte. An anode provides for removal of the resulting holes from the cathode. Cathode and anode are short circuited. For nitrogen molecule reduction, the electrolyte solution contains a chemical species capable in reduced form of chemically binding molecular nitrogen and of facilitating a series of reduction steps on the nitrogen. Specifically, such a chemical species is titanium isopropoxide.

12 Claims, 5 Drawing Figures

FLOW CELL ARRANGEMENT

FLOW CELL ARRANGEMENT

PHOTOENHANCED REDUCTION PROCESS

FIELD OF THE INVENTION

This invention relates to a system for the enhanced reduction of nitrogen by a photoelectrolytic process.

BACKGROUND OF THE INVENTION

Nitrogen fixation can be achieved either biologically or through a nonbiological process. Industrial nitrogen fixation currently involves the catalytic combination of molecular nitrogen and molecular hydrogen into ammonia at high pressure (~350 atm) and high temperature (−500° C.) via the well-known Haber process. Ammonia is then used directly as a fertilizer, or it is converted to other useful reduced or oxidized nitrogen compounds.

Biological nitrogen fixation occurs by the action of certain very limited classes of bacteria; these bacteria are sometimes associated with the root systems of certain plants such as soybean, alfalfa, clover, tropical herbs, and aquatic ferns.

E. E. Van Tamelen and co-workers have reported (Journal of the American Chemical Society, Vol. 90, page 4492 (1968) and Vol. 91, page 5194 (1969)) the electrolytic reduction of $N_2$ to $NH_3$ using a non-aqueous electrolyte of glyme (1,2-dimethyoxyethane), aluminum chloride, and titanium tetraisopropoxide. An external voltage of 90 volts was applied across two platinum electrodes while $N_2$ was bubbled through the electrolyte. Upon hydrolysis of the electrolyte, ammonia was recovered in a 10% yield based on the total titanium originally present.

A report on a process for photoelectrolytic molecular nitrogen fixation employing $TiO_2$ powder is found in *Chemical and Engineering News*, Oct. 3, 1977, page 19.

G. N. Schrauzer et al. in Journal of the *American Chemical Society*, Vol. 99, page 7189 (1977) disclose photolysis of water and photoreduction of nitrogen on titanium dioxide powder.

In U.S. Pat. No. 4,011,149 the photoelectrolytic dissociation of water into hydrogen and oxygen is disclosed. This process, called photoelectrolysis, involves the conversion of optical energy into chemical energy through an endoergic chemical reaction using photoactive semiconductor electrodes.

Steven N. Frank and Allen J. Bard in Journal of the American Chemical Society Vol. 99, page 4667 (1977) broadly suggest that photoassisted reductions at p-type materials can be carried out to produce new materials with light, rather than electrical or chemical energy, supplying the driving force for the reaction.

In accordance with private information received in a letter dated May 19, 1978 from M. Halmann, Associate Professor, The Weizmann Institute of Science, Rehovot, Israel, the writer of the letter has been working on an unspecified novel application of p-type semiconductor electrodes for photoassisted reduction reactions in the field of organic chemistry.

A photoelectrolytical process is characterized by the conversion of optical energy into chemical energy. A photocatalytic process is characterized by the conversion of optical energy into the activation energy required to drive the chemical reaction.

The prior art processes for nitrogen fixation under mild, ambient conditions are relatively inefficient. Furthermore, the prior art electrolysis processes require either an external voltage source or a strong reducing agent, such as sodium or potassium metal, which is expended during the process.

SUMMARY OF THE INVENTION

It is an object of the present invention to provide a new and simple process for the fixation of nitrogen under mild conditions.

It is another object of the present invention to provide an efficient process for nitrogen fixation.

It is a further object of the invention to provide a system for nitrogen fixation which does not require an external voltage source, but which uses sunlight to provide the activation energy for the nitrogen fixation reaction.

It is another object of the invention to provide a system for photocatalytic reduction of nitrogen which uses solar energy as the source of the activation energy required by the reduction reaction.

It is another object of the present invention to provide an electrolytic cell adapted to general photoreduction of nitrogen molecules.

The present invention provides a process for the reduction of nitrogen molecules bound to complexes and capable of being reduced. Electrons are being provided by a p-type semiconductor cathode having a band gap between about 0.8 and 3 eV in contact with an electrolyte solution containing nitrogen molecules bound to complexes and capable of being reduced. The cathode is irradiated with light having photons of an energy of between about 0.8 and 3 eV. The electrons generated by the incident light on the cathode surface are injected into the electrolyte solution in contact with the cathode surface for reducing the nitrogen molecules bound to the complexes and capable of being reduced.

Protons are provided to the reduced nitrogen complexes and electrical holes traveling to the anode are eliminated by electrons provided by an oxidation reaction.

DETAILED DESCRIPTION OF THE INVENTION

Figure 1:
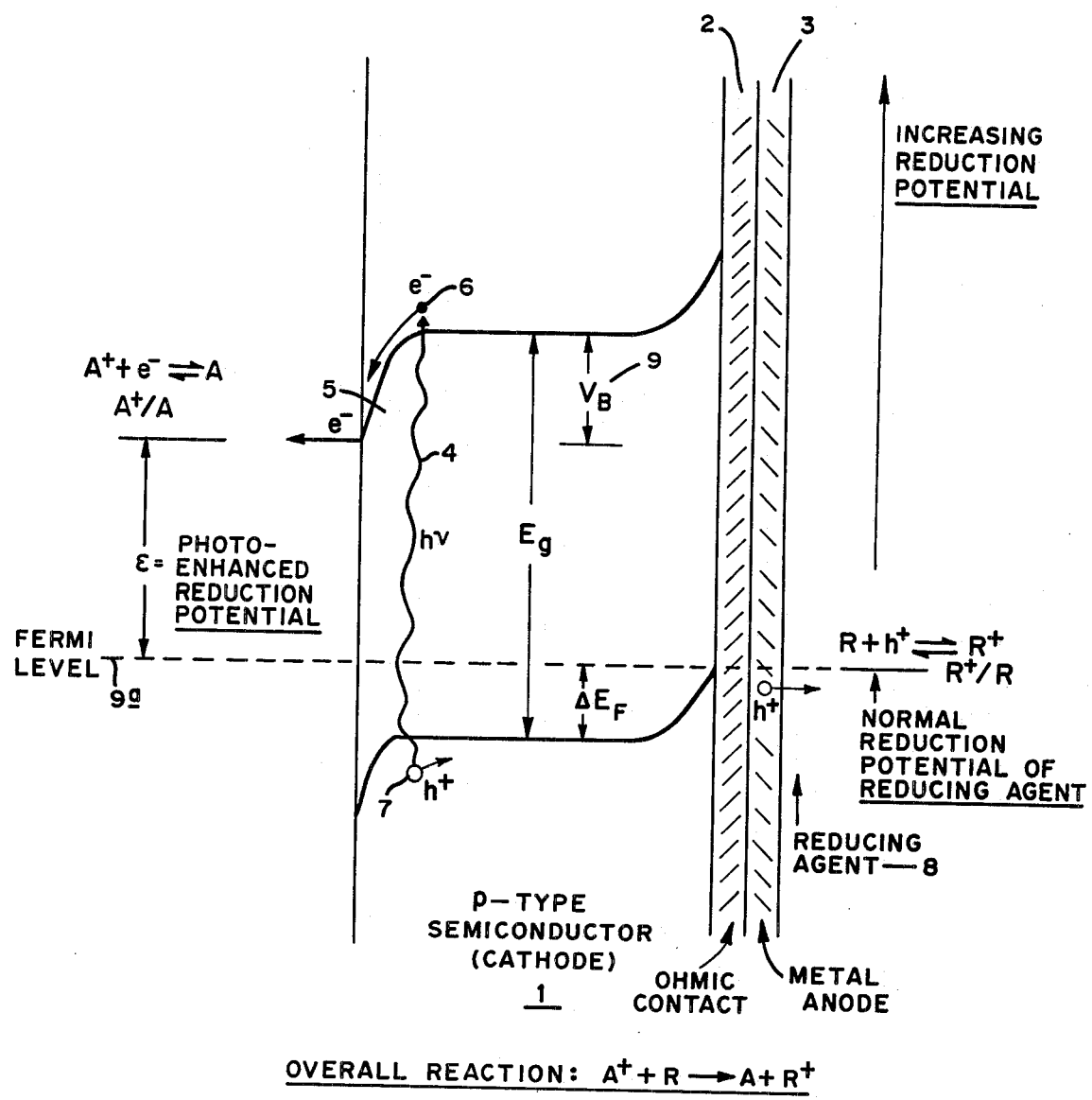
FIG. 1 shows a schematic diagram of the energy levels involved in the photoenhanced reduction process.

The apparatus used to carry out the invention consists essentially of a photoelectrochemical cell which comprises p-type semiconductor cathodes which are in short circuit electrical contact with an anode. The cathode and anode regions may comprise a single entity or particle, such as a photochemical diode described in commonly assigned patent application Ser. No. 728,474 filed Sept. 30, 1976; alternatively, the cathode and anode may be separate elements connected by a conducting wire or substrate. The two electrodes are immersed in an electrolyte which contains the chemical species to be reduced in the vicinity of the cathode. The reducing agent comprises either the anode itself or a chemical species provided in the vicinity of the anode.

For the case of nitrogen reduction or fixation, nitrogen gas is bubbled through the electrolyte in the vicinity of the p-type semiconductor cathode.

Reduction is achieved by illumination of the p-type semiconductor cathode with light having photon energies greater than the band gap of the semiconductor. This produces electron-hole pairs in the semiconductor which separate in the space charge layer present in the semiconductor near the semiconductor-electrolyte junction. The photo-generated electrons are injected, due to the potentials at the interface, into the electrolyte with a reduction potential which is greatly enhanced. Electrons are withdrawn through the external circuit from the anode, whereby holes are effectively injected into the electrolyte at the normal oxidation potential of the reducing agent being oxidized at the anode. The external circuit between cathode and anode can contain a voltage source.

Sources for nitrogen molecules suitable in the present invention for nitrogen fixation include nitrogen gas, vapors from liquid nitrogen, air, nitrogen mixed with noble gases, and residual burner gases. The nitrogen containing gas can be introduced at the bottom of the solution near the cathode.

The pressure of the nitrogen gas can be between about 0.1 atm and 100 atm and preferably between about ½ atm and 2 atm.

The photons suitable in the present invention have an energy between about 0.5 eV and about 4 eV and preferably between about 1 eV and 3 eV.

Optical sources providing such energy distributions include any radiation source such as direct light from the sun, light from incandescent lamps, light from arc lamps, light from gas discharges, light from diodes, light from lasers, light from vapors, light from hot bodies, and light from hot liquids.

The light can be guided from its source to the semiconductor surface by means of optical elements such as mirrors, lenses, gratings, optical fibers and light guides.

p-Type semiconductors useful in the present invention are found in the following classes of semiconductors: Group IV, Group II-VI, Group III-V, Group IV-VI and Group III-VI layered compounds, transition metal oxides, Group I-III-VI$_2$ and II-IV-V$_2$ ternary compounds, and ternary oxides, where "group" refers to a group or groups of the Periodic Table of the Elements, as designated by the numbers shown.

Preferred p-type semiconductors have band gaps ranging from about 1 eV to 3 eV and include Si, Ge, SiC, Cu$_2$O, NiO, Cu$_2$S, CdTe, ZnTe, GaP, GaAs, InP, InAs, AlAs, AlSb, GaSb, InP, CuInS$_2$, CuGaS$_2$, CuAlS$_2$, CuAlSe$_2$, ZnSiAs$_2$, ZnGeP$_2$, ZnSnAs$_2$, ZnSnP$_2$, CdSnP$_2$, CdSnAs$_2$, GaSe, GaS, GeS, GeSe, GeTe, SnS, SnTe, SnSe, MoS$_2$, and WS$_2$. Preferred semiconductors have electrical conductivities ranging from $10^{-3}$ to 1 ohm$^{-1}$ cm$^{-1}$.

Solvents to be useful in forming electrolyte solutions for purposes of this invention should be non-corrosive to semiconductor surfaces and should show good transparency to visible light. Such solvents include water and solvents such as alcohols, tetrahydrofuran, 1,2-dimethoxyethane, and bis(2methoxyethyl)ether. Sufficient conductivity of the solution may be provided by dissolving in the solvent a conductivity supporting electrolyte such as tetrabutylammonium chloride, bromide, perchlorate, fluoroborate, potassium chloride, potassium bromide, aluminum chloride and the like.

In the case of N$_2$ fixation, it is necessary to first bind molecular nitrogen molecules into a molecular complex in the electrolyte solution so that the nitrogen can be subsequently reduced. This is achieved by including in the electrolyte solution certain transition metal complexes, such as complexing species which are known to bind molecular nitrogen and which include ions of titanium, chromium, vanadium, molybdenum, cobalt, tungsten, nickel, and iron, and metalloorganic complexes of these metal ions.

Preferred complexing species for nitrogen include (a) titanium isoalkoxides with each alkoxide radical comprising up to eight carbon atoms, (b) 1,2 dithiolene complexes including compounds of the formula

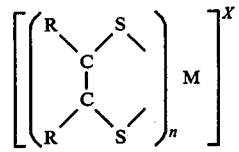

wherein R=H, alkyl with up to eight carbon atoms, C$_6$H$_5$, CF$_3$, CN; and wherein M is Mo, W, Cr, or V; and wherein if n=2: x=0, −1, −2; if n=3: x=0, −1, −2, −3;

(c) complexes of the formula

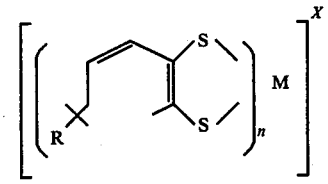

where R=H, or alkyl group with up to 8 carbon atoms; n=2; x=0, −1, −2; and M is Mo, W, Cr or V;

(d) a complex of the formula

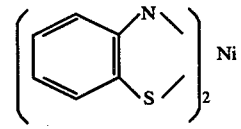

(e) a complex of the formula

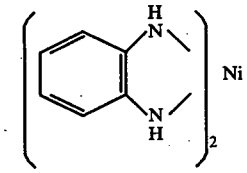

(f) complexes of the formula

MCl$_4$(P(CH$_3$)C$_6$H$_5$)$_2$ wherein M=Mo, W;

(g) a complex of the formula

[(C$_5$(CH$_3$)$_5$]$_2$ZrCl$_2$

More preferred is titanium tetraisopropoxide [Ti(O-i-C$_3$H$_7$)]$_4$ as a complex for photoenhanced reduction of nitrogen.

The concentrations of the solution are in the range of about $10^{-3}$ to 10 molar.

The anode, at which the oxidation reaction occurs and where the reducing agent in the system is oxidized, can consist of metals such as platinum, stainless steel, transition metals, and aluminum. The reducing agent which is oxidized at the anode can be introduced into the electrolyte at an inert electrode, such as, for example, hydrogen gas over a platinum electrode; or the anode itself can be a reducing agent and become oxidized, such as is the case for example, with aluminum electrodes. In the latter case, the aluminum anode is consumed during the photoreduction process.

In the case of nitrogen reduction with formation of protonated nitrogen derivatives, such as ammonia or hydrazine or nitrogen hydrogen acid (hydrozoic acid), it is necessary to provide a proton source in the electrolyte to ultimately combine with the reduced nitrogen. This proton source may be $H_2$ gas which is introduced into the cell and oxidized to $H^+$ at an inert anode such as platinum. Alternatively, the proton source may be the solvent itself or a solute species dissolved in the electrolyte solution. These proton sources include alcohols, ethers, esters, and other organic compounds containing detachable H atoms, such as methylalcohol, ethylalcohol, ethylacetate and ethylether. A particularly attractive and inexpensive proton source is water; however, water can only be used if the electrolyte and semiconductor electrode are stable in the presence of water.

In the absence of a proton source during reduction, the reduced nitrogen is converted to hydrazine and/or ammonia by the addition of a proton source, such as acid, base, or alcohol, to the system after the photon-enhanced reduction step is completed.

The temperature of the solution is not critical. A preferred solution temperature is between about 5° C. and 95° C., with a more preferred range being between about 20° C. and 60° C.

The externally applied potential between anode and cathode should be between about 0 V and about 10 V, with preferably no external voltage applied. To provide a calibration of the photoenhanced potential obtained in accordance with this invention, several redox reactions can be used which involve a color change when one species is reduced. Transition metal complexes are suitable for such indication such as those useful in forming reducible complexes with nitrogen. Titanium isopropoxide nitrogen complexes exhibit such color changes.

The energetics of this process is shown schematically in FIG. 1. A p-type semiconductor cathode 1 with band gap $E_g$ is connected through an ohmic contact 2 to a metal anode 3. Light 4 with energy, $h\nu$ (h is Planck's constant and $\nu$ is the frequency of the light), greater than $E_g$ is absorbed in the space charge region 5 to produce electrons 6 and holes 7. A reducing agent is introduced into the electrolyte near the anode such that the reducing agent 8 is oxidized at its normal reduction potential ($R/R^+$). The Fermi level 9a in the semiconductor coincides with the $R/R^+$ reduction potential. The photogenerated electron is available as a reducing agent at a reduction potential which is much greater than the reduction potential of the reducing agent introduced into the electrolyte. The minimum enhanced reduction potential, E, in volts is equal to:

$$E = E_g - V_B - \Delta E_F \quad (1)$$

where $E_g$ is the semiconductor band gap in eV, $V_B$ is the band bending 9 at the semiconductor-electrolyte interface in eV, and $\Delta E_F$ is the energy difference between the Fermi level and the valence band edge in eV. For any given reducing agent introduced into the electrolyte, the reduction potential of this reducing agent can be enhanced by at least an amount given by Equation (1). Even greater reduction potentials can be obtained if the electrons are injected into the electrolyte before they undergo full intraband relaxation in the semiconductor depletion layer. Thus, reduction reactions which are difficult to perform or which have high activation energies can be driven with light via the photoenhanced reduction process.

Figure 2:
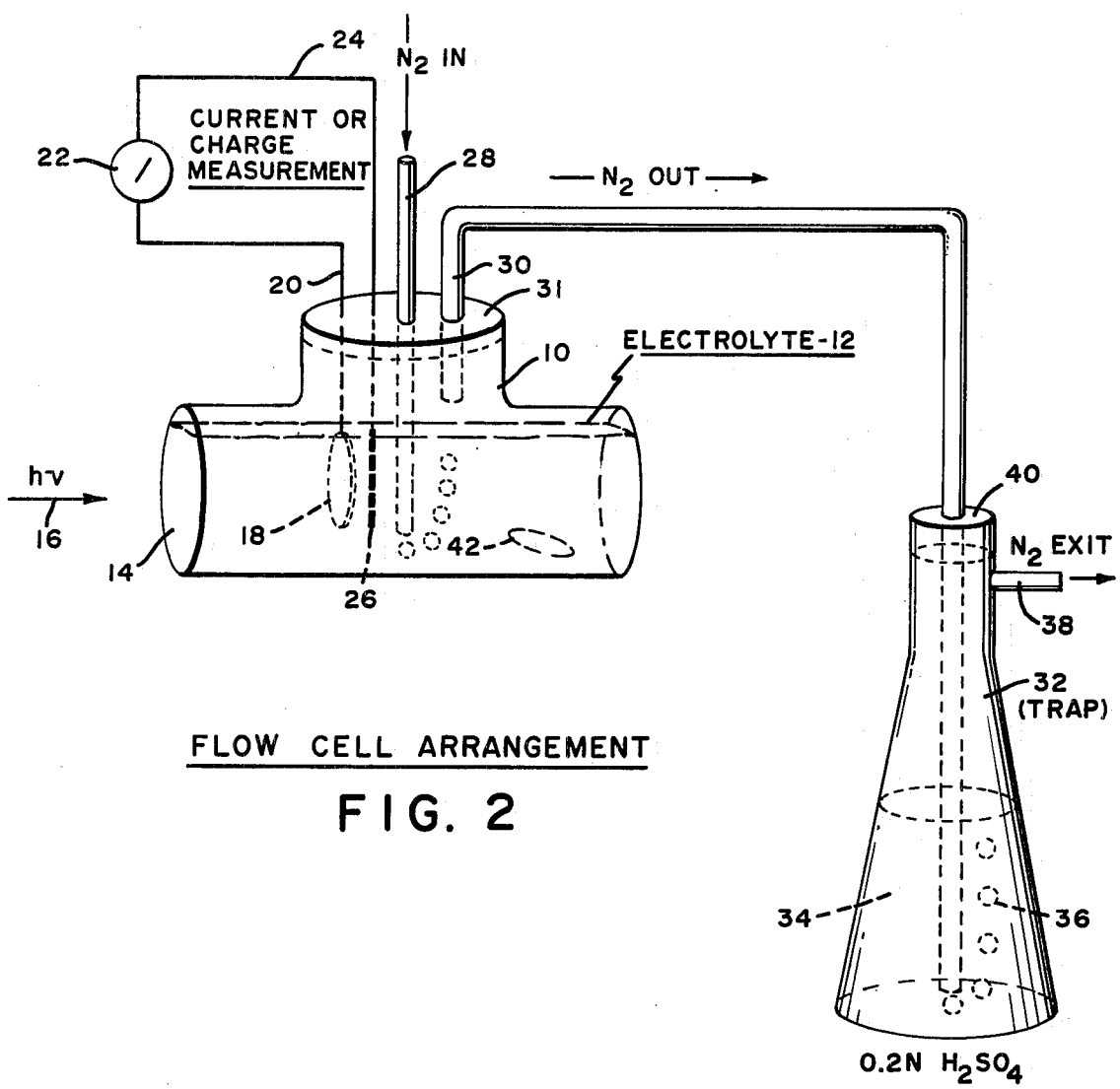
FIG. 2 shows a schematic diagram of an apparatus for photoelectric fixation of nitrogen.

Referring now to FIG. 2 there is shown an apparatus for photoelectric fixation of nitrogen.

A container 10 is filled with electrolyte 12. The container 10 is provided with a window 14 for transmitting photons 16 into the container and onto an electrode 18. Electrode 18 is connected with a conductive wire 20 to a load 22 and the other side of the load is connected with a conductive wire 24 to an anode 26. An inlet tube 28 is provided for bringing nitrogen molecules into the electrolyte 12. An outlet tube 30 is provided for removing excess nitrogen. The container 10 is otherwise closed at its top with a cover 31. Tube 30 can run into a trap 32 for providing a buffer towards the ambient air. Trap 32 can be filled with a liquid 34 such as diluted sulfuric acid through which excess nitrogen 36 is bubbled. Above the level of the liquid 34 an exit 38 is provided for releasing the excess nitrogen into the ambient air; the trap 32 is closed off against the ambient by a sealing stopper 40. Optionally a magnetic stirrer 42 can be provided to agitate the electrolyte for better dispersion of the $N_2$ gas into the electrolyte.

Figure 3:
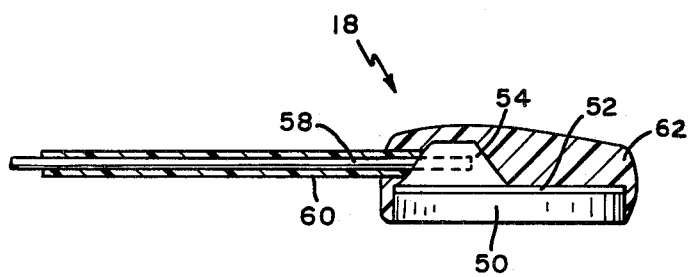
FIG. 3 shows a schematic diagram of an assembly of a photoelectrode for photoelectric fixation of nitrogen.

Referring now to FIG. 3 there is shown an assembly of a photoelectrode 18 used for the reduction of nitrogen.

A photoactive p-type semiconducting element 50 is in contact with an ohmic contact 52. The semiconducting element 50 can be p-type gallium phosphide having a bandgap of about 2.3 eV. The ohmic contact 52 should be made from a material which prevents the development of a Schottky barrier, such as a 1% Zn in Au alloy for p-type gallium phosphide. The ohmic contact may be between about 0.1 and 2 microns thick. The ohmic contact 52 is contacted with a conducting material 54, such as a conducting silver epoxy. The conducting epoxy material 54 then bonds a conducting wire 58 to the electrode, and the wire 58 is protected against the electrolyte by an insulating sleeve 60. The wire 58 can be a copper wire and the sleeve can be a polyethylene insulation. Insulation 62 covers ohmic contact 52 and conductive epoxy 54.

For purposes of this invention, a p-type gallium phosphide crystal wafer can be provided with a photoactive surface by first polishing with 5 micron alumina, etching in aqua regia for about fifteen minutes, followed by etching in 1:1:3 $H_2O/H_2O_2/H_2SO_4$ solution. The ohmic contact can be produced by evaporating a 1% Zn/Au alloy onto the back surface of the gallium phosphide. Thicknesses as small as 0.1–0.2 microns provide ohmic contacts. The resistance of such evaporated contacts as measured for a 1 mm separation of two such electrodes on the gallium phosphide surface can be about 20 ohm before heat treatment. After heat treatment of the evaporated contact in a hydrogen atmosphere at a temperature of between about 200° C. and 600° C. the resistance of the evaporated contact to the gallium phosphide is reduced to less than about 3 ohm.

EXAMPLE 1

A photoelectrochemical process was observed when hydrogen gas was bubbled over a platinum anode that was short circuited to a p-GaAs or p-GaP cathode. Upon illumination, hydrogen bubbles appeared on the cathode with little or no applied bias. The process involves the oxidation of hydrogen gas to hydrogen ions at the platinum anode and the reduction of hydrogen ions back to hydrogen gas at the illuminated cathode. However, the reduction potential produced at the illuminated semiconductor is enhanced over the standard hydrogen reduction potential by an amount approximately equal to the difference between the conduction band edge and the hydrogen-hydrogen ion redox couple (Equation (1)). Because the reduction potential is photo-enhanced at the semiconductor electrode, difficult chemical reduction reactions, requiring large activation energies are possible with this process.

EXAMPLE 2

Nitrogen gas was continuously purged through a flow cell like that shown in FIG. 2.

The cell contained an electrolyte consisting of a mixture of $Ti(OC_3H_7)_4$ and $AlCl_3$ in a 1:1.5 molar ratio dissolved in 1,2-dimethoxyethane. Specifically, the electrolyte composition was:

titanium isopropoxide: 11.4 g (40 millimoles)
aluminum chloride: 8.4 g (60 millimoles)
1,2-dimethoxyethane: 80 ml The trap contained 0.2 $NH_2SO_4$.

The dimethoxyethane was doubly distilled over sodium metal. The double distillation removed any ammonia initially present in the 1,2-dimethoxyethane. None of the starting materials showed a positive reaction to Nessler's reagent (potassium mercury iodide), indicating that the amount of ammonium ion present was less than about 0.2 parts per million.

To obtain a clear electrolyte solution, the aluminum chloride was first added to the 1,2-dimethoxy ethane; then the titanium isopropoxide was added which caused complete dissolution of the aluminum chloride.

The cell electrodes were a p-GaP cathode and an aluminum anode. The ohmic contact to the p-gallium phosphide was an evaporated Au-1% Zn alloy, and the carrier concentration of p-gallium phosphide was about $1.4 \cdot 10^{17}$ cm$^{-3}$. The purging nitrogen gas flowed at a rate of 0.03 cubic feet/hour. The light intensity was 100 mw/cm$^2$ of white light produced by a xenon lamp, and the samples were exposed for a 24 hour period. The weight loss of the aluminum anode, the total charge, and the amount of ammonium ion produced were monitored during the run. Typical photocurrents produced were between about 0.2 and 1 ma/cm$^2$.

As the reaction proceeds, the solution turns from clear amber to green to blue to black. This is caused by reduction of the $Ti^{4+}$ complex in the electrolyte to a $Ti^{2+}$ complex through a series of steps:

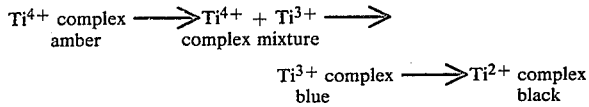

Reduced titanium complexes bind molecular nitrogen, and the bound nitrogen is then reduced in solution and "fixed". Ammonia or hydrogen is formed when the reduced nitrogen is protonated. The electrolyte and the acid trap are analyzed for $NH_4+$ ions to determine the extent of $N_2$ reduction.

The amount of $NH_4+$ ion formed in this system was found to be between 1 and 10 atomic percent of the total titanium present in the system. This degree of $N_2$ reduction was achieved with no external bias applied to the cell. The amount of $NH_4+$ found in the electrolyte and trap varied widely among the experiments, but the total $NH_4+$ produced was always much greater for the illuminated cell compared to control experiments in the dark. This variation is most likely due to changes in the flow rate of the nitrogen gas caused by a restriction of the entrance port by dried electrolyte.

A control experiment was conducted where the flowing nitrogen was replaced by argon. All other conditions remained identical. As expected, no significant yield of reduced nitrogen was found.

The reducing agent in this example is the aluminum anode. During the run, aluminum metal is oxidized to aluminum ion, and a loss of weight of the aluminum anode is observed.

EXAMPLE 3

The conditions were the same as in Example 2, however the aluminum anode was replaced by platinum over which hydrogen was bubbled. The p-GaP/Pt system produced photocurrents comparable to the p-GaP/Al system, but the degree of nitrogen fixation was lower by a factor of about ten.

EXAMPLE 4

The electrolyte of Example 2 was exposed to light with no electrodes present. The solution darkened indicating the presence of reduced titanium. However, no $NH_4+$ production was observed without the presence of electrodes.

EXAMPLES 5-9

A closed cell was constructed for simultaneous observation of several variables. The entire system was evacuated and back filled with nitrogen gas to slightly less than atmospheric pressure. The cell was then filled with several ml of electrolyte and illuminated. The total gas pressure, total charge, weight loss of aluminum electrode, and ammonia production were all measured.

Several experiments were completed in the closed cell. Examples 5 and 6 were identical and used an electrolyte of Example 2 composed of the 1:1.5 molar ratio of $Ti(OC_3H_7)_4$ and $AlCl_3$ in 1,2-dimethoxyethane and p-GaP and Al electrodes. Example 7 used an external voltage source connected to platinum and aluminum electrodes to reduce the nitrogen electrolytically without light. Finally, Examples 8 and 9, one where the nitrogen was replaced by argon and one where the titanium was omitted, were performed.

In Examples 5 and 6 the yields of $NH_4+$ produced relative to the total titanium present, based on $NH_4+$ analyses using Nessler's reagent, were several percent. This is similar to the results obtained with the p-GaP/Al electrodes in the flow cell of Example 2. The results of Example 7 were comparable to Examples 5 and 6, indicating that the external voltage source could be replaced by light.

Essentially no yield of ammonia (½%) was found when argon replaced the nitrogen in Examples 8 and 9. Finally, when the titanium ester was omitted, the $AlCl_3$ did not dissolve in the glyme. The solution did not conduct, and no significant ammonia yield was found.

EXAMPLE 10

Calibration of Photo-enhanced Reduction Potential

A visual demonstration of photo-enhanced reduction was obtained using n-heptyl viologen bromide, which turns purple on reduction. Upon illumination of a p-GaP/Pt photochemical diode immersed in a 0.1 M KBr electrolyte containing 0.01 M concentration of the viologen compound, a bright purple coloration appeared on the GaP portion of the diode. The reaction is

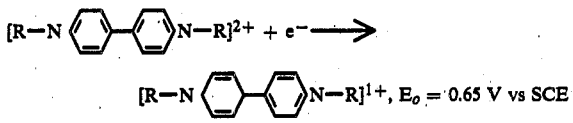

where R is the n-heptyl group. The air sensitive free radical is the purple film which appears on the GaP electrode.

The viologen compound was also used to measure the reduction potential for various electrode systems and gas purges, by observing the point at which color appears as a bias voltage is applied. For example, a $-1.2$ V bias applied between two Pt electrodes was required to reduce the viologen compound in the dark. When p-GaP/Al and p-GaP/Pt electrodes were used in the presence of light, the reduction occurred with no applied bias. In fact, an anodic bias of $+0.8$ V and $+0.3$ V was required to prevent the reduction when p-GaP/Al and p-GaP/Pt electrodes were used respectively. Thus, nearly a 2.0 V and a 1.5 V "enhancement" occurred for the p-GaP/Al and p-GaP/Pt system, respectively.

EXAMPLE 11

Observation of the process of photo-enhanced reduction was visually made with vanadium ions in aqueous solution. The reduction of $V^{+3}$ to $V^{+2}$ involves a color change from light blue to violet and the reaction is above the $H_2/H^+$ redox level; hence $H_2$ would not normally reduce $V^{+3}$ to $V^{+2}$. The reduction occurs on illuminated p-GaP because of the photo-enhanced reduction effect. The color change was observed when Sn and W were used as anodes (anodic oxidation potentials of Sn and W are also below the $V^{3+}/V^{3+}$ redox level). No bias was required to observe the color change but a large bias of 1.8 V was required to permit this observation in a few minutes.

EXAMPLE 12

Nitrogen-15 experiments were performed to show conclusively that nitrogen was fixed by photo-enhanced reduction. The same experiments as those described by Examples 6 and 7 were performed except that nitrogen-15 was used instead of natural occurring nitrogen. Analysis of the electrolyte by Fourier Transform infrared spectroscopy revealed the presence of $^{15}NH_3$. This means that nitrogen gas is indeed reduced to ammonia, and that the ammonia did result from reduction of some more easily reducible nitrogen compound present as an impurity.

We claim:

1. In a process for the reduction of nitrogen molecules bound to complexes and capable of being reduced, the improvement comprising:
   providing a source of electrons comprising a p-type semiconductor cathode having a band gap between about 0.8 and 3 eV in contact with an electrolyte solution containing nitrogen molecules bound to complexes and capable of being reduced;
   irradiating the cathode with light having photons of an energy of between about 0.8 and 3 eV;
   injecting electrons generated by the incident light on the cathode surface into the electrolyte solution in contact with the cathode surface for reducing the nitrogen molecules bound to complexes and capable of being reduced;
   providing protons to the reduced nitrogen complexes; and
   providing an anode in contact with said electrolyte solution and electrically connected to said cathode; and
   eliminating electronic holes generated in the cathode and traveling to the anode via said electrical connection with electrons generated by an oxidation reaction at the anode.

2. The process of claim 1 in which the oxidation reaction uses the anode material.

3. The process of claim 2 in which the anode material is aluminum metal.

4. The process of claim 1 in which the oxidation reaction at the anode is oxidation of hydrogen gas.

5. The process of claim 4 wherein a platinum anode is employed.

6. The process of claim 1 in which the electrolyte solution consists of a solution of aluminum chloride and titanium tetraisopropoxide in 1,2 dimethoxyethane.

7. The process of claim 1 in which the incident light source is a solar energy source.

8. The process of claim 1 in which water is provided as a proton source for formation of protonated nitrogen derivatives.

9. The process of claim 1 in which the semiconductor cathode is p-GaP.

10. The process of claim 1 wherein molecular nitrogen is bubbled through the electrolyte solution near the cathode.

11. The process of claim 1 wherein a protonated nitrogen dervative is formed.

12. The process of claim 11 wherein the protonated nitrogen derivative is ammonia, hydrazine, or hydrazoic acid.

* * * * *